(12) United States Patent
Raman et al.

(10) Patent No.: US 10,858,930 B2
(45) Date of Patent: Dec. 8, 2020

(54) REAL-TIME MONITORING OF HYDROCARBON PRODUCTIONS

(71) Applicant: Saudi Arabian Oil Company, Dhahran (SA)

(72) Inventors: Vinay Raman, Lexington, MA (US); Anthony Andrew Kmetz, II, Cambridge, MA (US); Jason R. Cox, Ashland, MA (US)

(73) Assignee: Saudi Arabian Oil Company, Dhahran (SA)

( * ) Notice: Subject to any disclaimer, the term of this patent is extended or adjusted under 35 U.S.C. 154(b) by 249 days.

(21) Appl. No.: 15/861,400

(22) Filed: Jan. 3, 2018

(65) Prior Publication Data
US 2019/0203581 A1    Jul. 4, 2019

(51) Int. Cl.
| | | |
|---|---|---|
| E21B 47/06 | (2012.01) | |
| E21B 49/08 | (2006.01) | |
| E21B 43/16 | (2006.01) | |
| G01N 30/72 | (2006.01) | |
| G05B 13/04 | (2006.01) | |
| G01N 30/02 | (2006.01) | |

(52) U.S. Cl.
CPC .............. *E21B 47/06* (2013.01); *E21B 43/16* (2013.01); *E21B 49/08* (2013.01); *E21B 49/088* (2013.01); *E21B 49/0875* (2020.05); *E21B 2200/22* (2020.05); *G01N 30/7206* (2013.01); *G01N 2030/025* (2013.01); *G05B 13/04* (2013.01)

(58) Field of Classification Search
CPC .......... E21B 47/06; E21B 43/16; E21B 49/08; E21B 49/088; E21B 2041/0028; E21B 2049/085; G06N 3/04; G01N 30/7206; G01N 2030/025; G05B 13/04
USPC ......................................................... 703/10
See application file for complete search history.

(56) References Cited

U.S. PATENT DOCUMENTS

| | | | |
|---|---|---|---|
| 7,249,009 B2 | 7/2007 | Ferworn et al. | |
| 7,526,953 B2 | 5/2009 | Goodwin et al. | |
| 7,810,563 B2 | 10/2010 | Buijse et al. | |

(Continued)

OTHER PUBLICATIONS

International Search Report and Written Opinion issued in International Application No. PCT/US2018/067038 dated Mar. 29, 2019, 20 pages.

(Continued)

*Primary Examiner* — Kamini S Shah
*Assistant Examiner* — Faraj Ayoub
(74) *Attorney, Agent, or Firm* — Fish & Richardson P.C.

(57) ABSTRACT

A method includes obtaining a sample of a fluid from a subterranean zone while the fluid is being extracted from the zone. A chemical composition of the sample is measured. A temperature and a pressure of the subterranean zone are measured. The measured properties are associated with a time point. The measured properties are incorporated into a set of historical data. A chemical composition of a fluid to be extracted from the subterranean zone at a future time point is determined based on the set of historical data. A presence of a liquid phase in the fluid to be extracted from the subterranean zone at the future time point is determined. A flow rate of the fluid being extracted from the subterranean zone is adjusted in response to determining the presence of the liquid phase in the fluid to be extracted from the subterranean zone at the future time point.

10 Claims, 6 Drawing Sheets

(56) References Cited

U.S. PATENT DOCUMENTS

| | | | |
|---|---|---|---|
| 7,920,970 B2 | 4/2011 | Zuo et al. | |
| 8,028,562 B2 | 10/2011 | Shah et al. | |
| 8,996,346 B2 | 3/2015 | Zuo et al. | |
| 9,664,665 B2 | 5/2017 | Gisolf et al. | |
| 2007/0119244 A1* | 5/2007 | Goodwin | G01N 1/12 |
| | | | 73/152.28 |
| 2014/0122047 A1 | 5/2014 | Saldivar et al. | |
| 2014/0208825 A1 | 7/2014 | Holba et al. | |
| 2016/0129371 A1* | 5/2016 | Black | B01D 17/0214 |
| | | | 210/137 |
| 2017/0067322 A1* | 3/2017 | Wong | E21B 41/00 |

OTHER PUBLICATIONS

Nikonov et al., "Development of Remote Gas Condensate Fields: Challenges and Solutions," SPE 176660-MS, SPE Russian Petroleum Technology Conference, Oct. 26-28, 2015, published Jan. 1, 2015, 21 pages.

Seah et al., "Optimizing Recovery in Gas Condensate Reservoirs," SPE 171519-MS, SPE Asia Pacific Oil and Gas Conference and Exhibition, Oct. 14-16, published Oct. 16, 2014, 19 pages.

* cited by examiner

REAL-TIME MONITORING OF HYDROCARBON PRODUCTIONS

TECHNICAL FIELD

This specification relates to monitoring and controlling of fluid extraction from a subterranean zone, for example, monitoring the composition of a produced hydrocarbon gas.

BACKGROUND

Commercial-scale hydrocarbon production from source rocks and reservoirs requires significant capital. It is therefore beneficial to obtain as much accurate data as possible about a formation in order to assess its commercial viability and subsequently to optimize cost and design of development. Data can be collected before production, such as during drilling and logging applications, and during production. Hydrocarbon monitoring can be used to predict production, estimate reserves, and assess raw material quality of source rocks and reservoirs. Monitoring can aid in preventive action. Potential or impending problems can be mitigated or prevented proactively in contrast to dealing with problems reactively after process disruptions have already occurred. Exploration, reservoir management, and petrochemical manufacturing are a few of the many areas that can benefit from comprehensive hydrocarbon monitoring data.

SUMMARY

The present specification describes technologies relating to monitoring and controlling of fluid extraction from a subterranean zone.

An example implementation of the subject matter described within this disclosure is a method for real-time monitoring of fluid extraction from a subterranean zone. A sample of a fluid from the subterranean zone is obtained while the fluid is being extracted from the subterranean zone. A chemical composition of the sample of the fluid is measured. A temperature and a pressure of the subterranean zone are measured. By one or more processors, the measured chemical composition, the measured temperature, and the measured pressure are associated with a time point. By one or more processors, the measured chemical composition, the measured temperature, and the measured pressure are incorporated into a set of historical data. By one or more processors, a chemical composition of a fluid to be extracted from the subterranean zone at a future time point is determined based on the set of historical data. A presence of a liquid phase in the fluid to be extracted from the subterranean zone at the future time point is determined at least based on the determined chemical composition. A flow rate of the fluid being extracted from the subterranean zone is adjusted in response to determining the presence of the liquid phase in the fluid to be extracted from the subterranean zone at the future time point.

Aspects of the example implementation, which can be combined with the example implementation alone or in combination, include the following.

The method can include adjusting a mathematical model of the fluid based on the set of historical data, where the mathematical model represents at least one of a temperature, a pressure, a composition, and a physical property of the fluid.

The method can include using the model to determine a temperature and a pressure of the subterranean zone at the future time point.

The chemical composition of the sample of the fluid can be measured by at least one of gas chromatography or mass spectrometry.

Measuring the chemical composition of the sample of the fluid can include measuring at least one of a mole fraction or a mass fraction of a chemical species of the sample of the fluid.

Measuring the chemical composition of the sample of the fluid can include measuring at least one of a mole fraction or a mass fraction of a group of chemical species of the sample of the fluid.

The model can be an auto-regressive neural network model.

Determining the presence of the liquid phase in the fluid to be extracted from the subterranean zone at the future time point can include determining a dew point pressure of the fluid to be extracted from the subterranean zone at the future time point. Determining the presence of the liquid phase in the fluid to be extracted from the subterranean zone at the future time point can include comparing the determined dew point pressure of the fluid to be extracted from the subterranean at the future time point with the determined pressure of the subterranean zone at the future time point.

The dew point pressure can correspond to the measured temperature of the subterranean zone.

The dew point pressure can correspond to the determined temperature of the subterranean zone at the future time point.

Another example implementation of the subject matter described within this disclosure is a system for real-time monitoring of fluid extraction from a subterranean zone. The system includes a temperature sensor that can measure a temperature of the subterranean zone, a pressure sensor that can measure a pressure of the subterranean zone, a sampling device that can obtain a sample of a fluid extracted from the subterranean zone, a measurement device coupled to the sampling device, at least one hardware processor, and a non-transitory computer-readable storage medium coupled to the at least one hardware processor. The measurement device can measure a chemical composition of a sample obtained by the sampling device. The non-transitory computer-readable storage medium stores programming instructions for execution by the at least one hardware processor, in which the programming instructions, when executed, cause the at least one hardware processor to perform operations. The operations include associating a measured chemical composition, a measured temperature, and a measured pressure with a time point. The operations include incorporating the measured chemical composition, the measured temperature, and the measured pressure into a set of historical data. The operations include determining a chemical composition of a fluid to be extracted from the subterranean zone at a future time point based on the set of historical data. The operations include determining a presence of a liquid phase in the fluid to be extracted from the subterranean zone at the future time point at least based on the determined chemical composition. The operations include transmitting a signal that corresponds to a decrease in a flow rate of the fluid extracted from the subterranean zone based on a determination of the presence of the liquid phase.

Aspects of the example implementation, which can be combined with the example implementation alone or in combination, include the following.

The operations can include adjusting a mathematical model based on the set of historical data, where the mathematical model represents at least one of a temperature, a pressure, a composition, and a physical property of the fluid.

The operations can include using the model to determine a temperature and a pressure of the subterranean zone at the future time point.

The measurement device can include at least one of a gas chromatograph or a mass spectrometer.

The measurement device can measure at least one of a mole fraction or a mass fraction of a chemical species of the sample of the fluid.

The measurement device can measure at least one of a mole fraction or a mass fraction of a group of chemical species of the sample of the fluid.

The model can be an auto-regressive neural network model.

Determining the presence of the liquid phase in the fluid to be extracted from the subterranean zone at the future time point can include determining a dew point pressure of the fluid to be extracted from the subterranean zone at the future time point. Determining the presence of the liquid phase in the fluid to be extracted from the subterranean zone at the future time point can include comparing the determined dew point pressure of the fluid to be extracted from the subterranean zone at the future time point with the determined pressure of the subterranean zone at the future time point.

The dew point pressure can correspond to the measured temperature of the subterranean zone.

The dew point pressure can correspond to the determined temperature of the subterranean zone at the future time point.

The details of one or more implementations of the subject matter of this specification are set forth in the accompanying drawings and the description. Other features, aspects, and advantages of the subject matter will become apparent from the description, the drawings, and the claims.

DETAILED DESCRIPTION

Gas-condensate reservoirs are reservoirs that contain hydrocarbon mixtures that, upon pressure depletion, cross the dewpoint curve (that is, the pressure decreases to a pressure that is less than the dewpoint pressure). A gas condensate is a single-phase fluid at original reservoir conditions. Gas condensate consists predominantly of methane but also contains other hydrocarbons. Under certain conditions of temperature and pressure, a gas condensate can separate into two phases, a gas and a liquid that is called a retrograde condensate. As hydrocarbons are extracted from a reservoir (for example, using a well), the temperature of the subterranean zone does not substantially change, but the pressure decreases. When the pressure in a gas-condensate reservoir decreases to a certain point (called the saturation pressure or the dewpoint), a liquid phase that is rich in heavy ends (that is, molecular compounds with a heavier molecular weight than methane, such as heptane and octane) can drop out of solution as a liquid phase. In this description, the terms "light" and "heavy" describe molecular weights of chemical species. For example, methane is lighter than propane because methane has a lighter molecular weight than propane; inversely, propane is heavier than methane because propane has a heavier molecular weight than methane. The amount of liquid phase present depends not only on pressure and temperature, but also on the composition of the fluid.

Condensate liquid saturation can accumulate near a well due to drawdown (the difference between the average reservoir pressure and the flowing bottomhole pressure) less than the dewpoint pressure and can ultimately restrict the flow of gas. This choking (also referred as condensate blockage or condensate banking) can significantly reduce the productivity of a well. The choking effectively reduces the relative permeability of the gaseous phase. Relative permeability is a property that measures the relative ease of movement of one phase in the presence of another phase through a porous medium, such as reservoir rock. Reservoir pressure decreasing to a pressure that is less than the dewpoint can also cause the produced gas to contain less of the valuable heavy ends due to the heavy ends dropping out throughout the reservoir and the condensate having insufficient mobility to flow toward a producing well. Various factors contribute to condensate banking, such as fluid phase properties, formation flow characteristics, and pressures within the formation and in the wellbore. A direct method of reducing condensate buildup is to reduce the drawdown pressure, such that the bottomhole pressure remains greater than the dewpoint of the fluid being extracted from the reservoir. Other methods can be used to mitigate, remediate, or remove condensate blockage once it has occurred, but condensate banking is unavoidable once the dewpoint has been crossed. Examples of some methods are as injection of surfactants mixed with solvents to alter wettability of the reservoir, cyclic injection and production from the well (also referred as "huff and puff" treatment employing dry gas to vaporize condensate around the well), hydraulic fracturing, and acidizing.

In some implementations of the techniques described in the present specification, real-time monitoring of a composition of produced gas from a reservoir at the well head using gas chromatography and mass spectrometry can be used to predict retrograde gas condensate banking. The real-time data collected (and historical data) can be incorporated into an autoregressive neural network model to forecast compositions and corresponding dew point pressures, in comparison to predicted bottom-hole temperatures and pressures. In this specification, "real-time" is defined as the time during which fluid is being extracted from a subterranean zone. Heavier gases (that is, gases with heavier molecular weight) tend to reach their dew point at decreased pressures than lighter gases and are therefore more susceptible to liquefy in producing zones. By predicting condensate banking using the model, a throttle valve that controls gas production rate can be automatically actuated to reduce the gas production rate in order to mitigate the onset of condensate banking or at least until a treatment operation can be scheduled. The reduction in gas production rate can delay the onset of condensate banking, thereby providing production engineers additional time to investigate and make operational changes to prevent the predicted problems.

Figure 1:
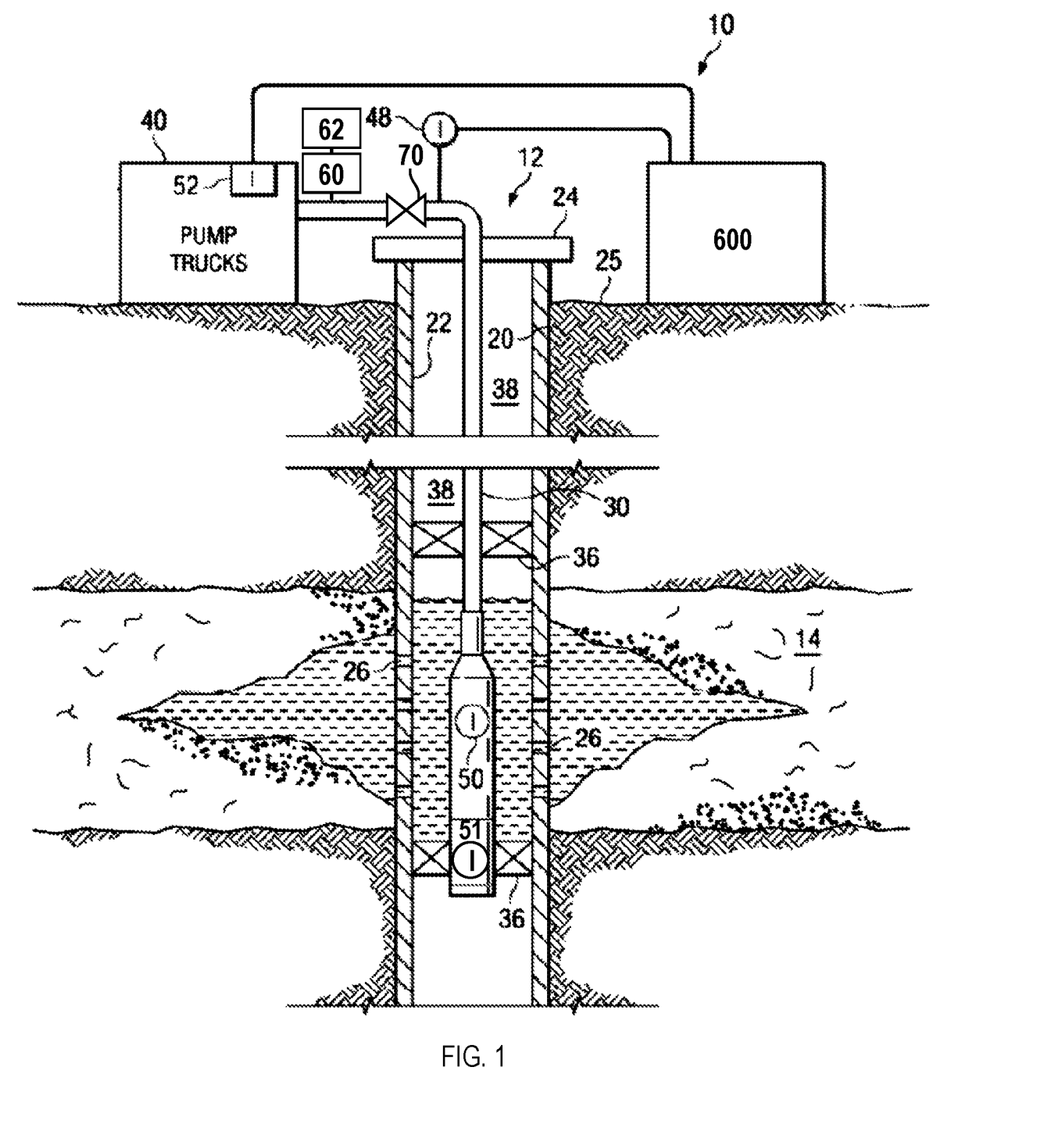
FIG. 1 is an example of a well.

FIG. 1 illustrates an example of a hydrocarbon extraction system 10 including a well 12. The well 12 can be in a wellbore 20 formed in a subterranean zone 14. The subterranean zone 14 can include, for example, a formation, a portion of a formation, or multiple formations in a hydrocarbon-bearing reservoir from which recovery operations can be practiced to recover trapped hydrocarbons. In some implementations, the subterranean zone 14 includes an underground formation of naturally fractured or porous rock containing hydrocarbons (for example, oil, gas, or both). For example, the subterranean zone 14 can include a fractured shale. In some implementations, the well 12 can intersect other suitable types of formations, including reservoirs that are not naturally fractured in any significant amount.

The well 12 can include a casing 22 and well head 24. The wellbore 20 can be a vertical, horizontal, deviated, or multilateral bore. The casing 22 can be cemented or otherwise suitably secured in the well bore 12. Perforations 26 can be formed in the casing 22 at the level of the subterranean zone 14 to allow oil, gas, and by-products (such as produced water) to flow into the well 12 and be produced to the surface 25. Perforations 26 can be formed using a perforating gun with shaped charges, or otherwise. In some cases, the well 12 is completed openhole without a casing. The production zone can be in a lower, openhole section of the well 12 without casing. In some implementations, the well head 24 can include a sampling system.

A work string 30 can be disposed in the well bore 20. The work string 30 can be coiled tubing, sectioned pipe or other suitable tubing. Packers 36 can seal an annulus 38 of the well bore 20 uphole of and down hole of the subterranean zone 14. Packers 36 can be mechanical, fluid inflatable or other suitable packers. One or more pump trucks 40 can be coupled to the work string 30 at the surface 25. The pump trucks 40 pump fluid down the work string 30, for example, to pump cement into the well bore 20 for completions or to pump injection fluids into the well bore 20 to stimulate production. The pump trucks 40 can include mobile vehicles, equipment such as skids or other suitable structures.

A control system 600 (additional details shown in FIG. 6) can also be provided at the surface 25. The control system 600 can monitor and control the pump trucks 40 and fluid valves, for example, to stop, start, and regulate pumping fluid into the well bore 20. The control system 600 can control hydrocarbon production of the well 12, for example, by adjusting a flow control device 70 (such as a valve or choke) located at the surface 25. The control system 600 communicates with surface and subsurface instruments to monitor and control a process, such as a well treatment process or hydrocarbon extraction process. In some implementations, the surface and subsurface instruments include surface sensors 48, down-hole pressure sensor 50 that can measure a pressure of the subterranean zone 14, down-hole temperature sensor 51 that can measure a temperature of the subterranean zone 14, and pump controls 52. The system 10 can include more than one pressure sensor 50 and more than one temperature sensor 51, such that multiple sensors can be disposed at varying depths within the well 12 in order to obtain more comprehensive data about the subterranean zone 14. The system 10 can include a sampling device 60 at or near the well head 24. The sampling device 60 can obtain a sample of a fluid extracted from the subterranean zone 14. A measurement device 62 can be coupled to the sampling device 60, and the measurement device 62 can be used to measure a chemical composition of a sample obtained by the sampling device 60. The measurement device 62 is a mass spectrometer, a gas chromatograph, or a combination of both.

In some implementations, the control system 600 includes at least one hardware processor and a non-transitory computer-readable storage medium coupled to the at least one hardware processor. The non-transitory computer-readable storage medium stores programming instructions for execution by the at least one hardware processor, and the programming instructions, when executed, cause the at least one hardware processor to perform operations. Alternatively, or in addition, the control system 600 can be implemented as processing circuitry (for example, hardware, firmware, electronic components, or combinations of them) that can perform operations.

The operations include associating a measured chemical composition, a measured temperature, and a measured pressure with a time point. The operations can include incorporating the measured chemical composition, the measured temperature, and the measured pressure into a set of historical data. The operations can include determining a chemical composition of a fluid to be extracted from the subterranean zone 14 at a future time point based on the set of historical data. The operations can include determining a presence of a liquid phase in the fluid to be extracted at least based on the determined chemical composition. The operations can include transmitting a signal that corresponds to a decrease in a flow rate of the fluid extracted from the subterranean zone 14 based on a determination of the presence of the liquid phase. The hydrocarbon extraction system 10 can be used to monitor hydrocarbon production, such as method 200 illustrated in FIG. 2 and described subsequently.

Figure 2:
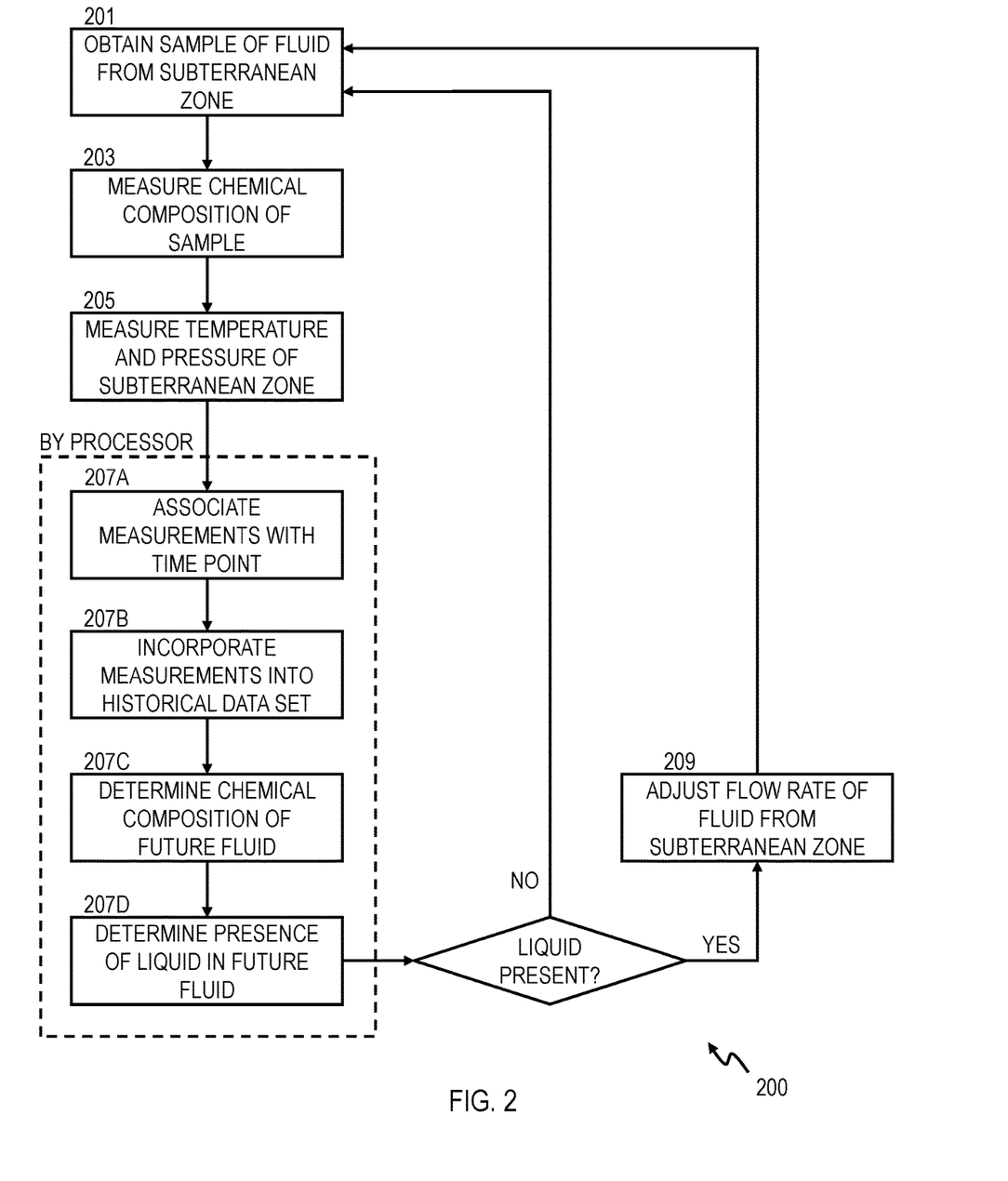
FIG. 2 is a flow chart illustrating an example method for monitoring fluid extraction from a subterranean zone.

FIG. 2 is a flow chart illustrating a method 200 for monitoring hydrocarbon production. At 201, a sample of fluid is obtained from a subterranean zone while the fluid is being extracted from the subterranean zone. A subterranean zone can be a formation, a portion of a formation, or multiple formations in a hydrocarbon-bearing reservoir. For example, the fluid being extracted from the subterranean zone can be a gaseous mixture of hydrocarbons. The sample of fluid can be obtained at a surface location, for example, at the well head. The sample of fluid can be obtained without interrupting the extraction of the fluid from the subterranean zone. For example, the sample of fluid can be obtained using the sampling device 60 installed on the well head 24. The frequency of sampling (201) can be once per day or faster (for example, once every 12 hours or once every 4 hours).

At 203, a chemical composition of the sample is measured. For example, the chemical composition of the sample is measured by the measurement device 62. In some implementations, the measurement device 62 measures the chemical composition of the sample within 15 to 30 minutes after obtaining the sample of fluid at 201. The chemical composition of the sample can be measured using gas chromatography, mass spectrometry, or a combination of both. The measurement device 62 can measure at least one of a mole fraction or a mass fraction of a chemical species of the sample. For example, the mole fractions of methane, ethane, and propane of the sample can be measured using gas chromatography or mass spectrometry. The measurement device 62 can measure at least one of a mole fraction or a mass fraction of a group of chemical species of the sample. For example, the mole fractions of light components (such as propane and components that are lighter than propane) and heavy components (such as hydrocarbons consisting seven carbon atoms or more) can be measuring used gas chromatography and mass spectrometry.

At 205, a temperature and a pressure of the subterranean zone is measured. The temperature of the subterranean zone 14 can be measured using, for example, the temperature sensor 51 that is located downhole within the subterranean zone 14. The pressure of the subterranean zone 14 can be measured, for example, using the pressure sensor 50 that is located downhole within the subterranean zone 14. The frequency of temperature and pressure measurement (205) can be faster than the frequency of sampling (201). As one example, the temperature and pressure can be measured once every 15 minutes.

Steps 207A, 207B, 207C, and 207D can be performed by one or more processors (for example, the processor 605 of the control system 600). At 207A, the measurements (such as temperature, pressure, and chemical composition) are associated with a time point (such as a current time point). In cases where temperature and pressure are measured at a faster frequency than sampling of the produced fluid, the multiple temperature and pressure measurements can be averaged and associated with the same time point that is associated with a fluid sample. For example, if the produced fluid is sampled once every 4 hours, and the temperature and pressure are measured once every 30 minutes, there can be 8 temperature and pressure measurements taken between a first fluid sampling and a second fluid sampling. The 8 temperature and pressure measurements can be averaged and associated with either the first fluid sampling or the second fluid sampling. At 207B, the measurements (along with the associated time point) are incorporated into a set of historical data. The set of historical data can be incorporated into a mathematical model (described in more detail later). The set of historical data can include at least a week's worth of historical data. Increasing amounts of historical data (for example, 1 month's to 4 months' worth of historical data) can improve the accuracy of the mathematical model. The mathematical model can represent a temperature of a fluid, a pressure of a fluid, a composition of a fluid, a physical property of a fluid, or combinations of these. In some cases, the mathematical model includes a non-linear autoregressive neural network model. An autoregressive neural network model is a neural network model that can be trained to predict a time series from the past values of the series. For non-linear autoregressive neural network models, the unknown variables appear as variables of a polynomial of degree higher than one or appear in the argument of a function, which is not a polynomial of degree one; therefore, the change in output is not proportional to the change in input. In other words, non-linear systems cannot be written as a linear combination of the unknown variables or functions that appear in the system. In some cases, the mathematical model includes an equation of state (EOS) model. The model can be used to determine phase equilibria of a fluid based on composition and operating conditions, such as temperature and pressure. In some cases, the measurements obtained at 203 and 205 or the set of historical data can be used to adjust the mathematical model. For example, the mathematical model can include an error component, and the set of historical data can be used to adjust the mathematical model, such that the error component decreases. In cases where data about the subterranean zone from which fluid is being extracted is available, this data can be used to calibrate or adjust the mathematical model. In cases where data about the subterranean zone from which fluid is being extracted is not available, data from nearby subterranean zones can be used to calibrate or adjust the mathematical model as an initial point.

At 207C, a chemical composition of the fluid to be extracted at a future time point is determined (that is, a chemical composition of a fluid that will be extracted from the subterranean zone at a future time instant relative to a present time instant or to a time instant at which the sample was collected). For example, the future time point can be 7 days in the future from the present time or from the time instant at which the sample was collected at 201. The mathematical model can be used to determine the chemical composition of the fluid to be extracted at the future time point based on the set of historical data. The mathematical model can also be used to determine (that is, predict) the temperature and pressure of the subterranean zone at the future time point based on the set of historical data. The mathematical model can include a set of functions that can determine chemical composition of the fluid to be extracted at a future time point based on the chemical composition of the current time point, previous time points (that is, a portion or all of the set of historical data), or combinations of these. For example, the mathematical model can include a set of functions that take current and past measurements of chemical composition to determine a chemical composition of the fluid to be extracted at a future time point (that is, the fluid that will be extracted from the subterranean zone). The mathematical model can include a set of functions that take current and past measurements of temperature (or pressure) to determine a temperature (or pressure) of the subterranean zone at a future time point.

At 207D, a presence of a liquid phase in the fluid to be extracted from the subterranean zone (at a future time point) is determined. In some cases, in order to determine the presence of the liquid phase in the fluid to be extracted, a dew point pressure of the fluid to be produced is determined at the determined temperature of the subterranean zone at the future time point. The dew point pressure of the fluid to be extracted can be determined using the mathematical model (described in more detail later). To determine the presence of the liquid phase in the fluid to be extracted, the determined dew point pressure of the fluid to be extracted can be compared with the determined pressure of the subterranean zone at the future time point. If the determined pressure of the subterranean zone at the future time point is less than or equal to the determined dew point pressure of the fluid to be extracted, then it can be concluded that a liquid phase is likely to be present in the fluid to be extracted. Otherwise, a liquid phase is likely to not be present in the fluid to be extracted. In such cases where a liquid phase is determined to not be present in the fluid to be extracted, the monitoring can be repeated (that is, the method 200 can restart at 201).

At 209, in response to determining the presence of the liquid phase in the fluid to be extracted, a flow rate of the fluid being extracted from the subterranean zone is adjusted before the future time point. For example, a throttle valve (such as the valve 70 in FIG. 1) which controls the rate of production of the well can be adjusted, such that the production rate is reduced. For example, the control system 600 can automatically drive the throttle valve to be adjusted based on determining the presence of the liquid phase in the fluid to be extracted. In some cases, the control system 600 automatically outputs a notification to direct an operator to adjust the throttle valve. The method 200 can then restart at 201. The flow rate of the fluid being extracted from the subterranean zone can, for example, be abruptly decreased (stepped down) once or multiple times until the evaluation of the fluid to be extracted determines that a liquid phase is likely not to be present in the fluid to be extracted. In some cases, the flow rate can be decreased continuously and gradually until the evaluation of the fluid to be extracted determines that a liquid phase is likely not to be present in the fluid to be extracted. The method 200 can continue to cycle as long as fluid is being extracted from the subterranean zone.

The following EOS model is presented by Pedersen et al. in "Phase Behavior of Petroleum Reservoir Fluids" (CRC Press, 2014) and is one example set of functions that the mathematical model can include. In some implementations, the control system 600 can execute the EOS model to implement some or all of the operations described earlier with reference to FIG. 2. Considering a fluid called Fluid A with n components, the dew point pressure can be determined by solving the following equation:

$$\sum_{i=1}^{n} \frac{z_i}{K_i} = 1 \quad (1)$$

where $z_i$ is the overall mole fraction of the i-th component, and $K_i$ is the distribution coefficient of the i-th component. Equation 1 can be solved iteratively in the following steps.

Step 1: Assume a dew point pressure ($P_d$), and estimate distribution coefficients by the following equation:

$$\log(K_i^j) = \log\left(\frac{P_{c,i}}{P_d^j}\right) + 5.373(1+\omega_i)\left(1 - \frac{T_{c,i}}{T}\right) \quad (2)$$

where T is the bottomhole temperature, subscript i denotes the i-th component, superscript j denotes the j-th iteration in solving Equation 1 (not an exponent or power), $P_c$ is the critical pressure, $T_c$ is the critical temperature, and $\omega$ is the acentric factor. $P_c$, $T_c$, and $\omega$ are parameters that can be adjusted (for individual chemical species or groups of chemical species) to improve accuracy of the model.

Step 2: Estimate liquid phase composition by the following equation:

$$x_i^j = \frac{z_i}{K_i^j} \quad (3)$$

where x is the mole fraction in the liquid phase, z is the overall mole fraction, and K is the distribution coefficient.

Step 3: Estimate vapor phase fugacity coefficients ($\phi_i^V$) by assuming the vapor composition is equal to the overall composition ($z_i$), and estimate liquid phase fugacity coefficients ($\phi_i^L$) by using the liquid composition ($x_i$) determined in Equation 3. The functional forms of the fugacity coefficients depend on the type of EOS model chosen.

Step 4: Determine new distribution coefficients by the following equation:

$$\log(K_i^{j+1}) = \log(\phi_i^V) - \log(\phi_i^L) \quad (4)$$

Step 5: Determine an error value (F) by the following equation:

$$F^j = \sum_{i=1}^{n} \frac{z_i}{K_i^{j+1}} - 1$$

Step 6: Determine error sensitivity to estimated dew point pressure by the following equation:

$$\frac{\partial F^j}{\partial P_d} = -\sum_{i=1}^{n} \frac{z_i}{K_i^{j+1}} \left(\frac{\partial \log(\phi_i^V)}{\partial P_d} - \frac{\partial \log(\phi_i^L)}{\partial P_d}\right) \quad (5)$$

Step 7: Estimate the dew point pressure by utilizing the error sensitivity (calculated in Equation 5) in the following equation:

$$P_d^{j+1} = P_d^j - \frac{F^j}{\frac{\partial F^j}{\partial P_d}} \quad (6)$$

Steps 2 through 7 can be iterated until the estimated dew point pressure has converged to an acceptable tolerance (for example, when the error sensitivity in Equation 5 is equal to or less than $10^{-6}$).

Figure 3:
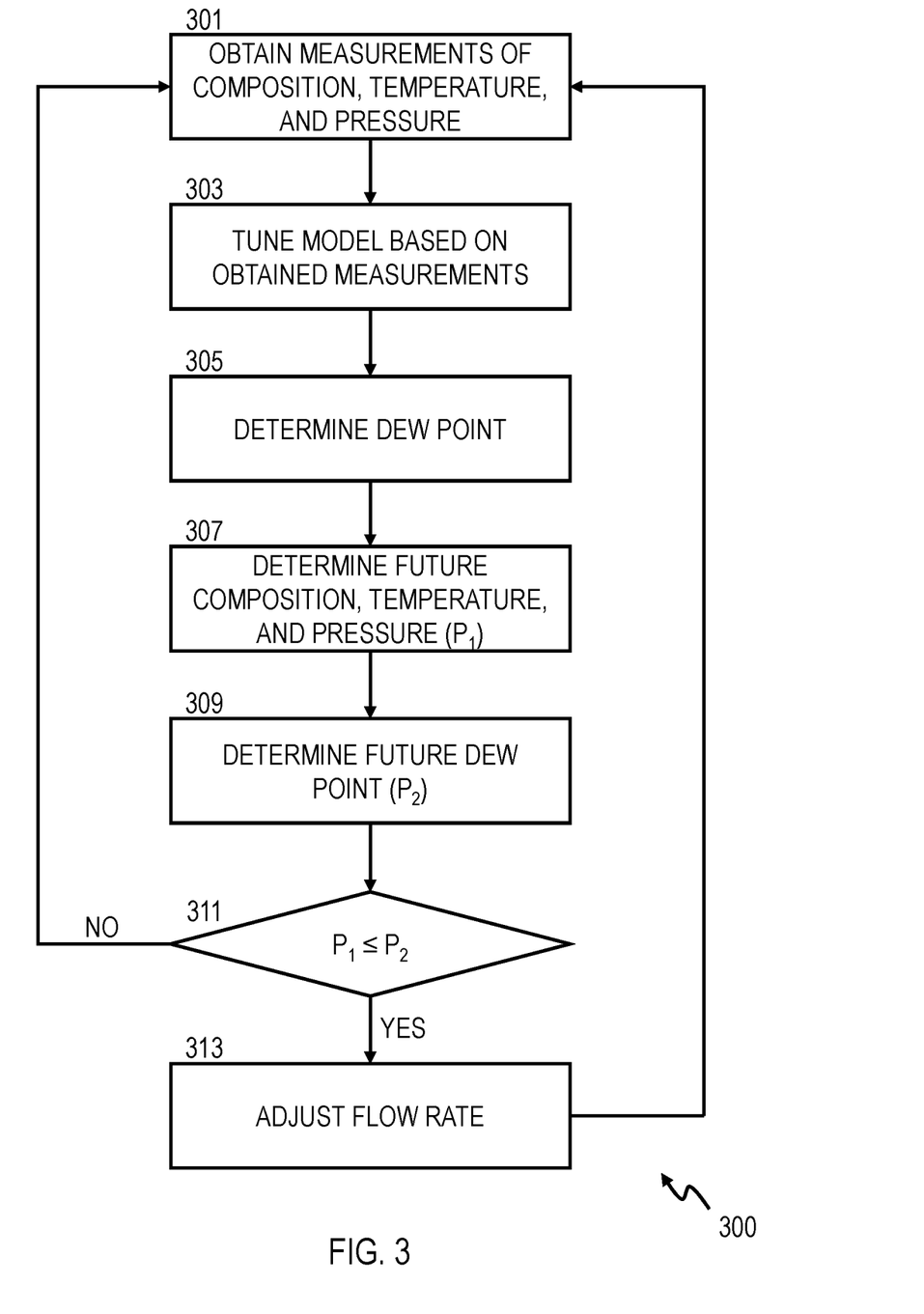
FIG. 3 is a flow chart illustrating an example method for monitoring fluid extraction from a subterranean zone.

FIG. 3 is a flow chart illustrating a method 300 for monitoring fluid extraction from a subterranean zone, such as the subterranean zone 14. A sample of the extracted fluid can be obtained, for example, using the sampling device 60 installed on the well head 24 at the surface 25. At 301, measurements of the chemical composition of the sample, a temperature of the subterranean zone 14, and a pressure of the subterranean zone 14 are obtained. For example, the chemical composition of the sample is obtained by utilizing the measurement device 62. The chemical composition can be measured using gas chromatography, mass spectrometry, or a combination of both. The chemical composition can be determined as a mixture of chemical species in mole or mass fractions. In some cases, chemical species that include hexane and molecules heavier than hexane can be grouped together, for example, a C6+ group. The temperature can be measured, for example, by the temperature sensor 51 located downhole within the subterranean zone 14. The pressure can be measured, for example, by the pressure sensor 50 located downhole within the subterranean zone 14.

Steps 303, 305, 307, 309, and 311 can be performed by one or more processors (for example, the processor 605 of the control system 600). At 303, a mathematical model is tuned based on the measurements obtained at 301. The mathematical model can be an EOS model, such as Peng-Robinson, Soave-Redlich-Kwong, or any derivatives or modified versions of these; examples can be found in the previously referenced book, "Phase Behavior of Petroleum Reservoir Fluids," by Pedersen et al. Tuning the mathematical model can involve adjusting an estimate on certain parameters, for example, an estimated critical property (such as critical temperature or critical pressure) of the C6+ group. In some cases, the mathematical model can be tuned less frequently in comparison to the frequency of sampling of the fluid being extracted from the subterranean zone 14.

At 305, the tuned mathematical model is used to determine a dew point pressure ($P_d$) of the extracted fluid. The mathematical model can include some or all of Equations 1 through 6 (or variations of them), and in some cases, the dew point pressure can be determined by iteratively converging on a calculated value.

At 307, a chemical composition of the fluid to be extracted from the subterranean zone 14, a temperature of the subterranean zone 14, and a pressure ($P_1$) of the subterranean zone 14 (all associated with a future time point) are determined using a non-linear auto-regressive neural network model based on the data obtained at 301 and data obtained previously. In some cases, a sensitivity of the dew point to the composition of the gas $$\left(\frac{\partial P_d}{\partial z_i}\right)$$

is determined at the most recent (that is, current) sampled time point:

$$\frac{\partial P_d}{\partial z_i} \approx \frac{P_d(z_i + \Delta z_i) - P_d(z_i)}{\Delta z_i}, \text{ for } i = 1, \ldots, n \quad (7)$$

where $\Delta z_i$ is the difference between the determined future mole or mass fraction of the i-th component at 307 and the measured mole or mass fraction of the i-th component at 301, and n is the total number of discrete components (such as individual chemical species or groups of chemical species) that make up the composition of the extracted fluid.

At 309, a future dew point pressure ($P_2$) of the fluid to be extracted from the subterranean zone 14 at the future point is determined using the following equation:

$$P_2 = P_d + \sum_{i=1}^{n} \left(\frac{\partial P_d}{\partial z_i}\right) \Delta z_i \quad (8)$$

At 311, the future dew point pressure ($P_2$) is compared to the future pressure ($P_1$) of the subterranean zone 14. If the future pressure of the subterranean zone 14 is greater than the future dew point pressure (that is, if $P_1 > P_2$), then the fluid extraction monitoring continues (that is, the method 300 returns to 301). If the future pressure of the subterranean zone 14 is less than or equal to the future dew point pressure (that is, if $P_1 \leq P_2$), then the method 300 continues to 313.

Figure 4:
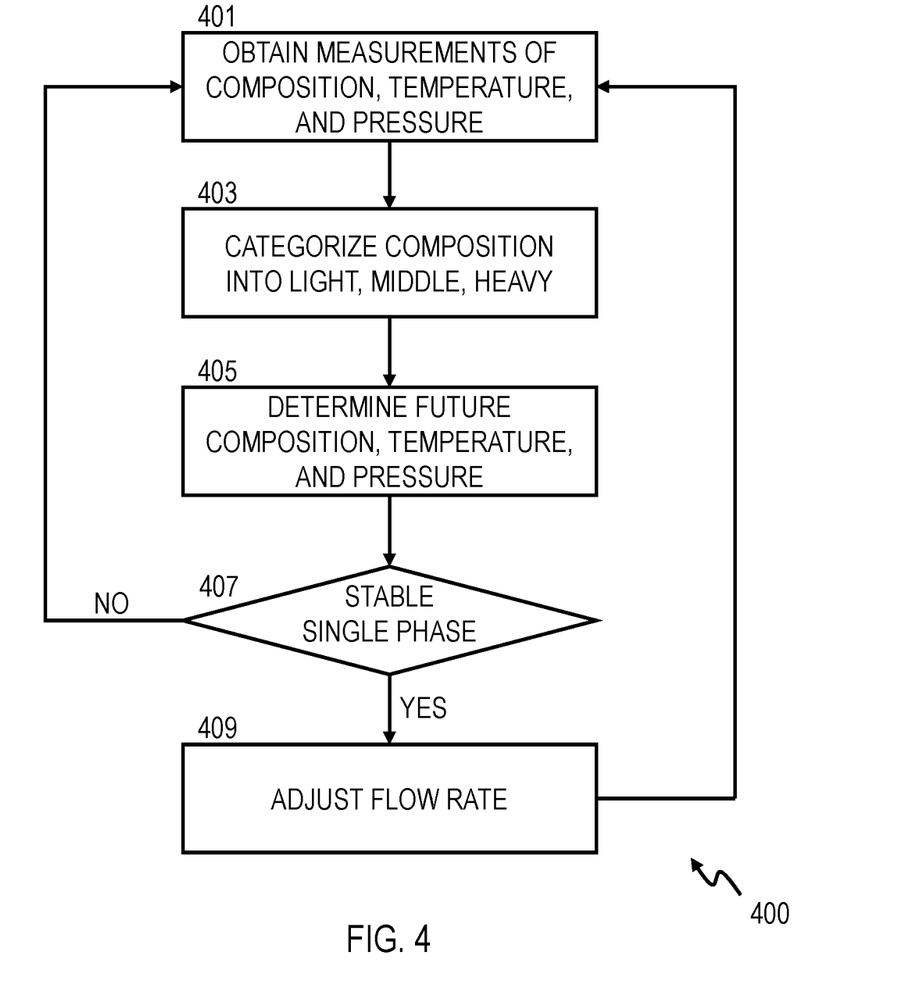
FIG. 4 is a flow chart illustrating an example method for monitoring fluid extraction from a subterranean zone.

At 313, a flow rate of fluid extraction from the subterranean zone 14 is adjusted. For example, a throttle valve (such as the valve 70 in FIG. 1) is adjusted to decrease the rate of fluid extraction from the subterranean zone 14. The reduction of production rate can delay impending condensate banking, which can give an operator more time to address the potential issue or a reservoir management team to explore and plan alternative strategies for hydrocarbon production from the subterranean zone 14. The method 300 can then return to 301. The method 300 can continue to cycle as long as fluid is being extracted from the subterranean zone FIG. 4 is a flow chart illustrating a method 400 for monitoring fluid extraction from a subterranean zone, such as the subterranean zone 14. A sample of the extracted fluid can be obtained, for example, using the sampling device 60 installed on the well head 24 at the surface 25. At 401, measurements of the chemical composition of the sample, a temperature of the subterranean zone 14, and a pressure of the subterranean zone 14 are obtained. For example, the chemical composition of the sample is obtained by utilizing the measurement device 62. The chemical composition can be measured using gas chromatography and mass spectrometry. The chemical composition can be determined as a mixture of chemical species in mole or mass fractions. The temperature can be measured, for example, by the temperature sensor 51 located downhole within the subterranean zone 14. The pressure can be measured, for example, by the pressure sensor 50 located downhole within the subterranean zone 14.

Steps 403, 405, 407, and 409 can be performed by one or more processors (for example, the processor 605 of the control system 600). At 403, the measured chemical composition of the sample is split into two or more chemical groups. For example, the chemical composition can be split into three groups. The first group can include light components, such as hydrogen sulfide ($H_2S$), carbon dioxide ($CO_2$), methane ($C_1$), $C_2$ hydrocarbons (that is, hydrocarbons containing two carbon atoms, such as ethane), and $C_3$ hydrocarbons (that is, hydrocarbons containing three carbon atoms, such as propane). The second group can include heavy components, such as $C_{7+}$ hydrocarbons (that is, hydrocarbons containing more than seven carbon atoms, such as octane) and other chemical species heavier than heptane. The third group can include components that are heavier than the components of the first group but lighter than the components of the second group, such as $C_4$ hydrocarbons (that is, hydrocarbons containing four carbon atoms, such as butane), $C_5$ hydrocarbons (that is, hydrocarbons containing five carbon atoms, such as pentane), $C_6$ hydrocarbons (that is, hydrocarbons containing six carbon atoms, such as hexane), and $C_7$ hydrocarbons (that is, hydrocarbons containing seven carbon atoms, such as heptane).

At 405, a chemical composition (in mole or mass fractions of the chemical groups, such as light, medium, and heavy) of the fluid to be extracted from the subterranean zone 14, a temperature of the subterranean zone 14, and a pressure of the subterranean zone 14 (all associated with a future time point) is determined using a non-linear auto-regressive neural network model based on the data obtained at 401 and data obtained previously.

At 407, a machine-learning based classification model is used to determine whether the future chemical composition provides a stable single phase (in contrast to two-phase) at the future temperature and the future pressure of the subterranean zone 14. The machine-learning based classification model can be calibrated or tuned with available experimental data (such as data obtained at 401) or offset well data. If a stable single phase is determined, the fluid extraction monitoring continues (that is, the method 400 returns to 401). If an unstable single phase (that is, two phase) is determined, then the method 400 continues to 409.

Figure 5:
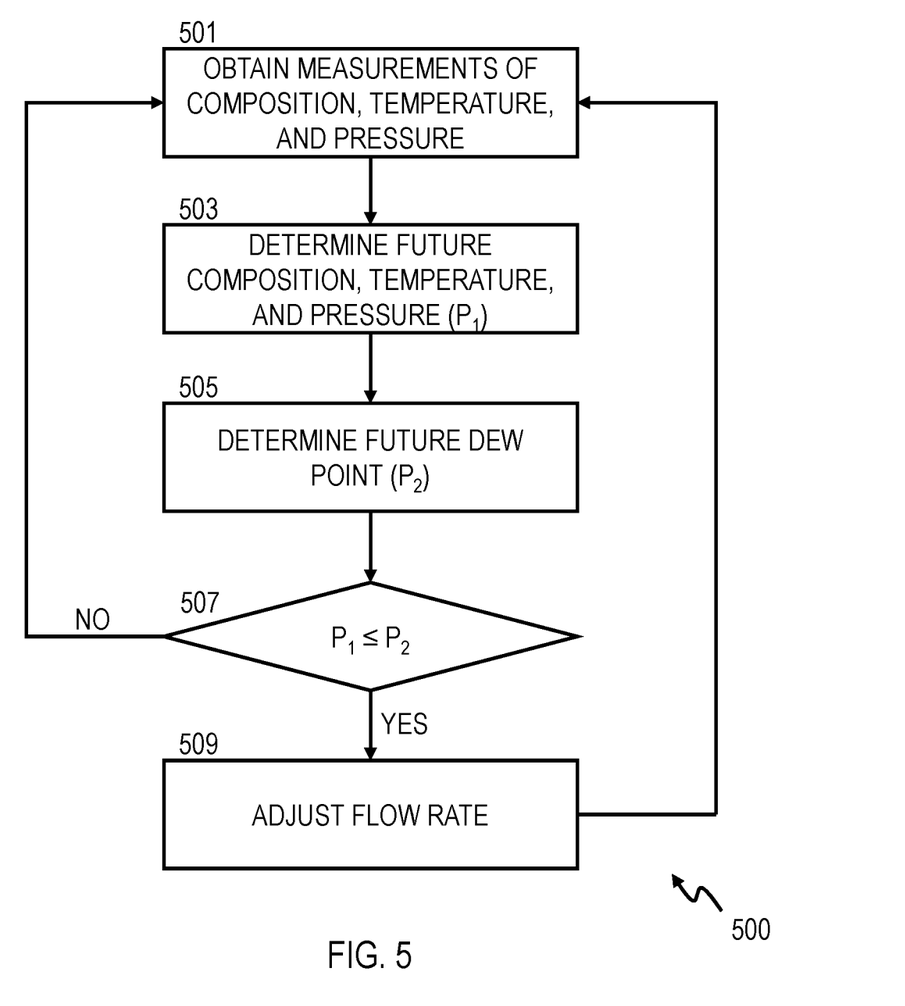
FIG. 5 is a flow chart illustrating an example method for monitoring fluid extraction from a subterranean zone.

At 409, a flow rate of fluid extraction from the subterranean zone 14 is adjusted. For example, a throttle valve (such as the valve 70 in FIG. 1) is adjusted to decrease the rate of fluid extraction from the subterranean zone 14. The method 400 can then return to 401. The method 400 can continue to cycle as long as fluid is being extracted from the subterranean zone FIG. 5 is a flow chart illustrating a method 500 for monitoring fluid extraction from a subterranean zone, such as the subterranean zone 14. A sample of the produced hydrocarbon can be obtained, for example, using the sampling device 60 installed on the well head 24 at the surface 25. At 501, measurements of the chemical composition of the sample, a temperature of the subterranean zone 14, and a pressure of the subterranean zone 14 are obtained. For example, the chemical composition of the sample is obtained by utilizing the measurement device 62. The chemical composition can be measured using gas chromatography and mass spectrometry. The chemical composition can be determined as a mixture of chemical species in mole or mass fractions. The temperature can be measured, for example, by the temperature sensor 51 located downhole within the subterranean zone 14. The pressure can be measured, for example, by the pressure sensor 50 located downhole within the subterranean zone 14.

Steps 503, 505, 507, and 509 can be performed by one or more processors (for example, the processor 605 of the control system 600). At 503, a chemical composition of the fluid to be extracted from the subterranean zone 14, a temperature of the subterranean zone 14, and a pressure ($P_1$) of the subterranean zone 14 (all associated with a future time point) are determined using a non-linear auto-regressive neural network model based on the data obtained at 501 and data obtained previously.

At 505, a dew point pressure ($P_2$) of the fluid to be extracted from the subterranean zone 14 at the future point is determined using a machine-learning based regression model. The machine-learning based regression model can be based on artificial neural networks, support vector machines, or Gaussian processes.

At 507, the future dew point pressure ($P_2$) is compared to the future pressure ($P_1$) of the subterranean zone 14. If the future pressure of the subterranean zone 14 is greater than the future dew point pressure (that is, if $P_1 > P_2$), then the fluid extraction monitoring continues (that is, the method 500 returns to 501). If the future pressure of the subterranean zone 14 is less than or equal to the future dew point pressure (that is, if $P_1 \leq P_2$), then the method 500 continues to 509.

Figure 6:
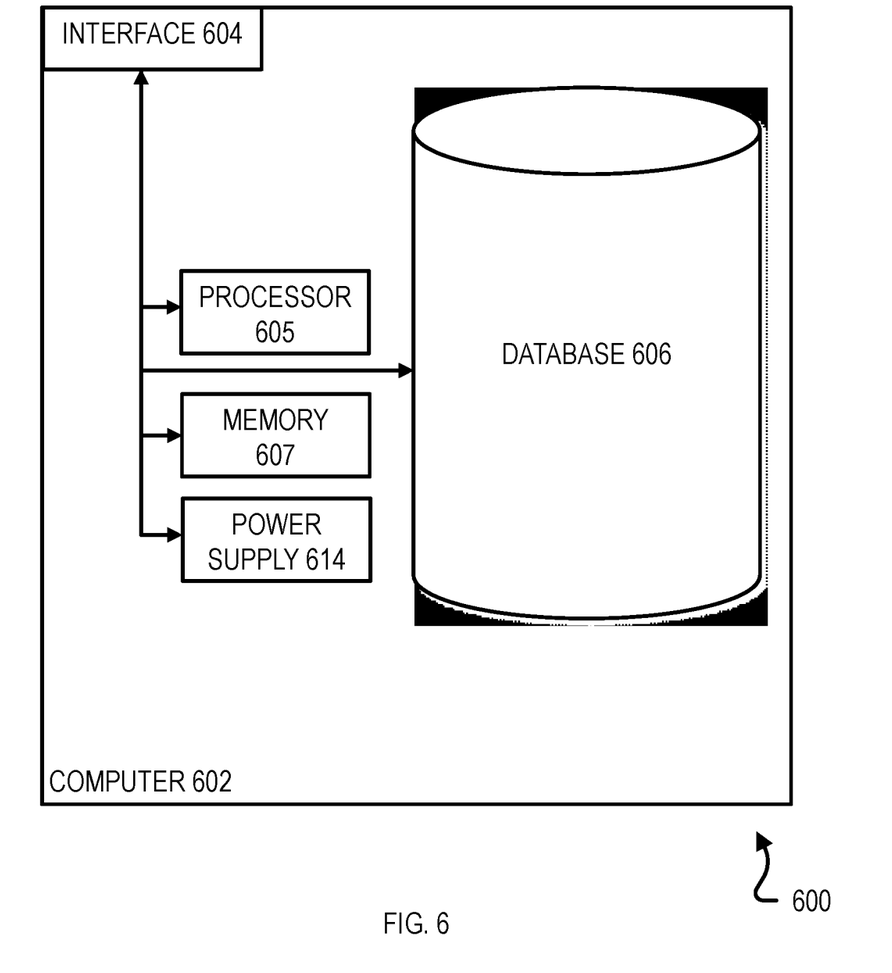
FIG. 6 is a block diagram illustrating an example computer used to provide computational functionalities.

At 509, a flow rate of fluid extraction from the subterranean zone 14 is adjusted. For example, a throttle (such as the valve 70 in FIG. 1) valve is adjusted to decrease the rate of fluid extraction from the subterranean zone 14. The method 500 can then return to 501. The method 500 can continue to cycle as long as fluid is being extracted from the subterranean zone FIG. 6 is a block diagram of an example computer system 600 used to provide computational functionalities associated with described algorithms, methods, functions, processes, flows, and procedures, as described in this specification, according to an implementation. The illustrated computer 602 is intended to encompass any computing device such as a server, desktop computer, laptop/notebook computer, one or more processors within these devices, or any other suitable processing device, including physical or virtual instances (or both) of the computing device. Additionally, the computer 602 can include a computer that includes an input device, such as a keypad, keyboard, touch screen, or other device that can accept user information, and an output device that conveys information associated with the operation of the computer 602, including digital data, visual, audio information, or a combination of information.

The computer 602 includes a processor 605. Although illustrated as a single processor 605 in FIG. 6, two or more processors may be used according to particular needs, desires, or particular implementations of the computer 602. Generally, the processor 605 executes instructions and manipulates data to perform the operations of the computer 602 and any algorithms, methods, functions, processes, flows, and procedures as described in this specification.

The computer 602 can also include a database 606 that can hold data for the computer 602 or other components (or a combination of both) that can be connected to the network. Although illustrated as a single database 606 in FIG. 6, two or more databases (of the same or combination of types) can be used according to particular needs, desires, or particular implementations of the computer 602 and the described functionality. While database 606 is illustrated as an integral component of the computer 602, in alternative implementations, database 606 can be external to the computer 602. The database 606 can include various modelling functions for droplet shapes, such as circular, conic section, polynomial, and Young-Laplace models.

The computer 602 includes an interface 604. Although illustrated as a single interface 604 in FIG. 6, two or more interfaces 604 may be used according to particular needs, desires, or particular implementations of the computer 602. The interface 604 is used by the computer 602 for communicating with other systems that are connected to the network in a distributed environment. Generally, the interface 604 comprises logic encoded in software or hardware (or a combination of software and hardware) and is operable to communicate with the network. More specifically, the interface 604 may comprise software supporting one or more communication protocols associated with communications such that the network or interface's hardware is operable to communicate physical signals within and outside of the illustrated computer 602.

The computer 602 also includes a memory 607 that can hold data for the computer 602 or other components (or a combination of both) that can be connected to the network. Although illustrated as a single memory 607 in FIG. 6, two or more memories 607 (of the same or combination of types) can be used according to particular needs, desires, or particular implementations of the computer 602 and the described functionality. While memory 607 is illustrated as an integral component of the computer 602, in alternative implementations, memory 607 can be external to the computer 602.

The memory 607 stores computer-readable instructions executable by the processor 605 that, when executed, cause the processor 605 to perform operations including associating a measured chemical composition, a measured temperature, and a measured pressure with a time point; incorporating the measured chemical composition, the measured temperature, and the measured pressure into a set of historical data; determining a chemical composition of a fluid to be extracted from a subterranean zone (such as the subterranean zone 14) at a future time point based on the set of historical data; determining a presence of a liquid phase in the fluid to be extracted at least based on the determined chemical composition; and transmitting a signal that corresponds to a decrease in a flow rate of the fluid extracted from the subterranean zone 14 based on a determination of the presence of the liquid phase.

The computer 602 can also include a power supply 614. The power supply 614 can include a rechargeable or non-rechargeable battery that can be configured to be either user- or non-user-replaceable. The power supply 614 can be hard-wired. There may be any number of computers 602 associated with, or external to, a computer system containing computer 602, each computer 602 communicating over the network.

Further, the term "client," "user," "operator," and other appropriate terminology may be used interchangeably, as appropriate, without departing from the scope of this specification. Moreover, this specification contemplates that many users may use one computer 602, or that one user may use multiple computers 602.

While this specification contains many specific implementation details, these should not be construed as limitations on the scope of the subject matter or on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results.

Accordingly, the previously described example implementations do not define or constrain this specification. Other changes, substitutions, and alterations are also possible without departing from the spirit and scope of this specification.

What is claimed is:

1. A system for real-time monitoring of fluid extraction from a subterranean zone, the system comprising:
   a temperature sensor configured to measure a temperature of the subterranean zone;
   a pressure sensor configured to measure a pressure of the subterranean zone;
   a sampling device configured to obtain a sample of a fluid being extracted from the subterranean zone;
   a measurement device coupled to the sampling device, the measurement device configured to measure a chemical composition of the sample obtained by the sampling device;
   a throttle valve configured to adjust a rate of fluid extraction from the subterranean zone;
   at least one hardware processor; and
   a non-transitory computer-readable storage medium coupled to the at least one hardware processor and storing programming instructions for execution by the at least one hardware processor, wherein the programming instructions, when executed, cause the at least one hardware processor to perform operations comprising:
      associating a measured chemical composition, a measured temperature, and a measured pressure with a time point;
      incorporating the measured chemical composition, the measured temperature, and the measured pressure into a set of historical data;
      determining a future chemical composition of the fluid to be extracted from the subterranean zone at a future time point based on the set of historical data;
      determining a presence of a liquid phase in the fluid to be extracted from the subterranean zone at the future time point at least based on the determined future chemical composition; and
      in response to determining the presence of the liquid phase in the fluid to be extracted from the subterranean zone at the future time point, mitigating an onset of condensate banking by automatically transmitting a signal to the throttle valve to decrease the rate of fluid extraction from the subterranean zone before the future time point.

2. The system of claim 1, wherein the operations further comprise adjusting a mathematical model based on the set of historical data, wherein the mathematical model represents at least one of the temperature, the pressure, the chemical composition, and a physical property of the fluid.

3. The system of claim 2, wherein the operations further comprise using the mathematical model to determine a future temperature and a future pressure of the subterranean zone at the future time point.

4. The system of claim 3, wherein the measurement device comprises at least one of a gas chromatograph or a mass spectrometer.

5. The system of claim 4, wherein the measurement device is configured to measure at least one of a mole fraction or a mass fraction of a chemical species of the sample of the fluid.

6. The system of claim 4, wherein the measurement device is configured to measure at least one of a mole fraction or a mass fraction of a group of chemical species of the sample of the fluid.

7. The system of claim 4, wherein the mathematical model is an auto-regressive neural network model.

8. The system of claim 4, wherein determining the presence of the liquid phase in the fluid to be extracted from the subterranean zone at the future time point comprises:
   determining a future dew point pressure of the fluid to be extracted from the subterranean zone at the future time point; and
   comparing the determined future dew point pressure of the fluid to be extracted from the subterranean zone at the future time point with the determined future pressure of the subterranean zone at the future time point.

9. The system of claim 8, wherein the dew point pressure corresponds to the measured temperature of the subterranean zone.

10. The system of claim 8, wherein the dew point pressure corresponds to the determined future temperature of the subterranean zone at the future time point.

* * * * *